United States Patent

[11] 3,522,795

| [72] | Inventor: | Gerd W. Seifert |
| | | Unterschondorf/Ammersee, Germany |
| [21] | Application No.: | 788,397 |
| [22] | Filed: | Jan. 2, 1969 |
| [45] | Patented: | Aug. 4, 1970 |

Continuation-in-part of Application Ser. No. 705,743, Feb. 15, 1968, which is a Continuation-in-part of Application Ser. No. 599,908, Dec., 1966, now Pat. No. 3,396,909.

| [32] | Priority: | Jan. 5, 1968 |
| [33] | | Germany |
| [31] | | No. P1601439.4 |

[54] FAN ARRANGEMENT FOR AUTOMOTIVE VEHICLES AND THE LIKE
7 Claims, Drawing Figs.

[52] U.S. Cl. .................................................. 123/41.12, 192/43.1, 58, 104; 230/270
[51] Int. Cl. .................................................... F01p 7/02, F16d 11/06, F04d 25/14
[50] Field of Search ....................................... 230/270; 192/104, 105, 65, 58X, 43.1; 123/41.12

[56] References Cited

UNITED STATES PATENTS

| 3,059,745 | 10/1962 | Tauschek .................. | 192/104(F)X |
| 3,257,808 | 6/1966 | Kuiper ...................... | 60/54 |
| 3,339,688 | 9/1967 | Harvey ..................... | 192/58(A-1) |
| 2,452,008 | 10/1948 | Wickwire, et al ........ | 192/105(A) |
| 3,363,734 | 1/1968 | Sabat ........................ | 192/58(A-1) |
| 3,366,097 | 1/1968 | Ferris, et al .............. | 123/41.12 |

FOREIGN PATENTS

| 957,506 | 5/1964 | Great Britain Kemp | 230/270 |

Primary Examiner—Leonard H. Gerin
Attorney—Karl F. Ross

ABSTRACT: A centrifugally actuated clutch, especially for the fan blade of the cooling system of an internal-combustion engine, in which the load or fan-blade shaft is journaled with respect to the driven shaft and coaxially therewith in a bearing. The co-operating members of the clutch are located radially outwardly of the bearing, preferably in a clutch housing which surrounds the bearing in the radial sense and which also may extend axially about the bearing. Fluid or friction clutching may be used. A partition can separate a thermostatic clutch from a centrifugally operated clutch.

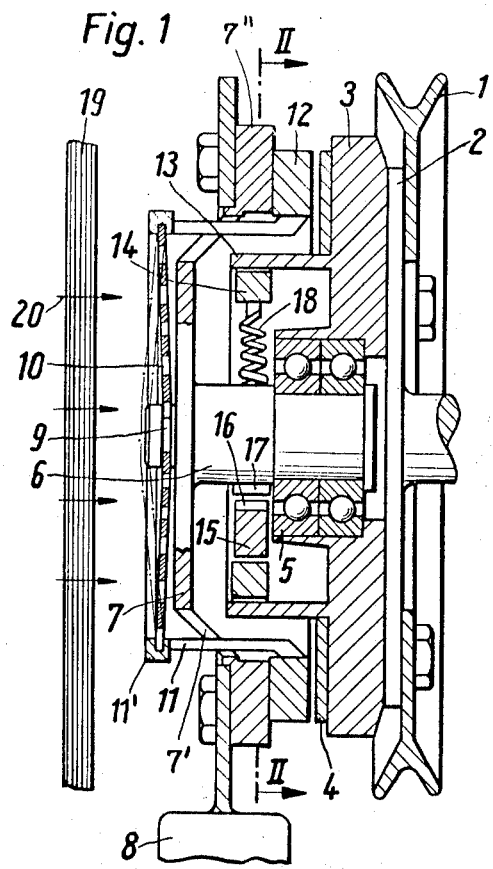
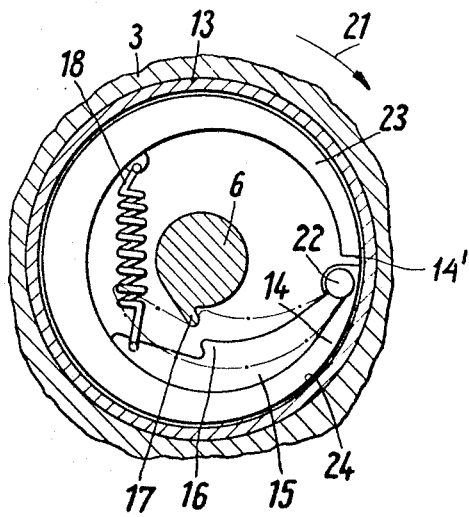
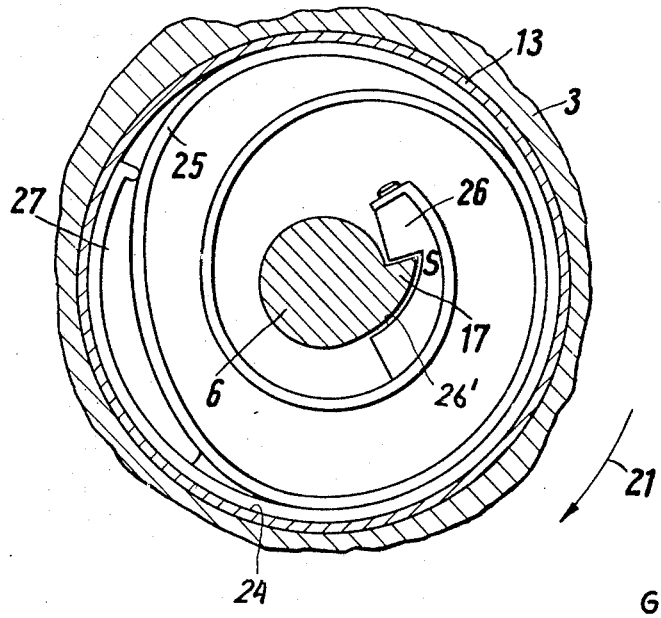

Patented Aug. 4, 1970
3,522,795
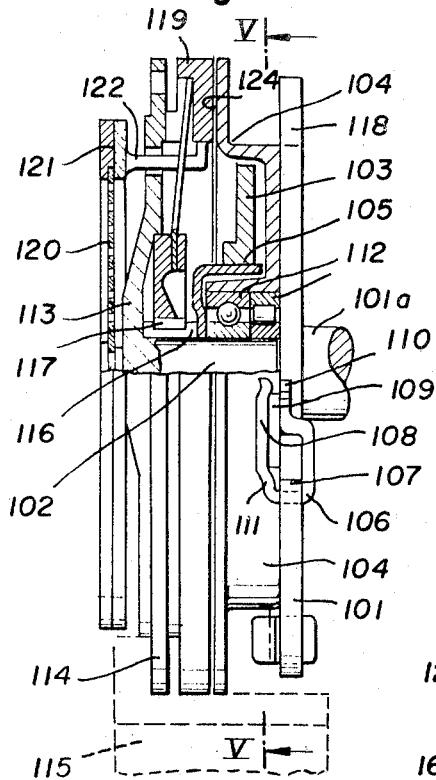
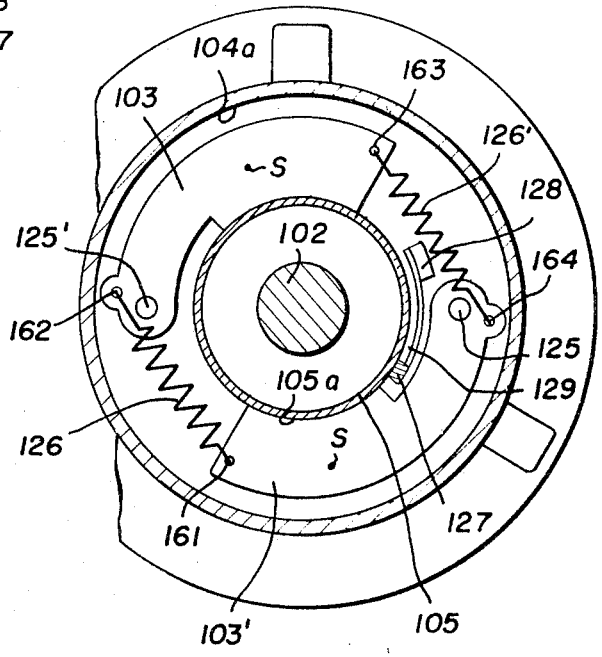
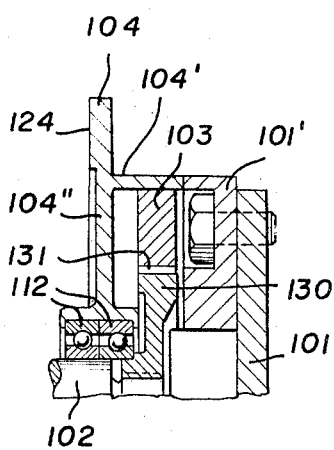
INVENTOR;
GERD W. SEIFERT
BY
Karl F. Ross
ATTORNEY INVENTOR:
GERD W. SEIFERT
BY
Karl F. Ross
ATTORNEY

U.S. PATENT 3,522,795
FAN ARRANGEMENT FOR AUTOMOTIVE VEHICLES AND THE LIKE

This application is a continuation-in-part of my application Ser. No. 705,743 of 15 February 1968 which in turn is a continuation-in-part of application Ser. No. 599,908 filed 7 December 1966 now U.S. patent No. 3,396,909.

My present invention relates to a fan arrangement for internal-combustion engines and, more particularly, to a cooling system for automotive vehicles.

As has been pointed out in the aforementioned application Ser. No. 705,793 in internal-combustion engines, especially those of automotive vehicles, it has been proposed to provide between the fan blade and the driving means therefore, a clutch arrangement operated by a thermostat to maintain the operation of the fan blade only when the cooling system of the vehicle has reached a predetermined minimum temperature, thereby insuring rapid attainment of the optimum temperature for the operation of the engine.

In general, the thermostat is disposed in the path of the air passing through a heat exchanger of the cooling system, i.e. the vehicle radiator, while the clutch of the self-tightening type as described, for example, in my then copending application Ser. No. 599,908 filed 7 December 1966 (now U.S. patent no. 3,396,909) and my earlier patents Nos. 3,209,993 and 3,273,681. In these latter systems, thermostatic torque-responsive clutches are provided, the clutches have a bimetallic element in the path of the airstream traversing the vehicle radiator and are adapted to shift a clutch member between open and closed positions. A self-tightening screw-and-nut arrangement was provided to develop the axial force necessary to insure full engagement of the clutch. In general, self-tightening clutches of this type can be considered to have two co-operating clutch members, originally disengaged, but which are brought into rapid interengagement by a pair of co-operating camming formations (e.g. mating threads of a large pitch angle) which can be referred to as "coarse pitch" or "steep pitch" threads. The interengagement is promoted by an incipient rotary entrainment of a clutch member by the other as initiated by the thermostatic device. In the system of U.S. patent No. 3,396,909, the clutch comprises a driving clutch member juxtaposed with an axially shiftable driven clutch member upon which the axially movable member of a screw-and-nut self-tightening mechanism can operate; the bimetallic element acts upon the movable clutch member to effect incipient rotation thereof and rotatable entrainment of the respective element of the self-tightening means to render the latter effective in applying axial force to the movable clutch member.

In fan arrangements of this type as well as others using a thermostatic device in the path of air traversing the vehicle radiator, it is desirable to have the clutch cut in and out at a relatively high temperature corresponding to optimum engine operation; this results in an increased wear of the clutch and maintains the running time of the fan blade within a limited portion of the running time of the engine. It will be understood that this type of system has the inherent disadvantage that in an idling state of the vehicle, when vehicle velocity is zero, i.e. at standstill, the air which would otherwise reach the thermostatic element fails to traverse the radiator or is so cold upon traversal that an incorrect indication of the cooling system termperature is conveyed to the thermostatic element. In order to avoid this disadvantage, it has been proposed to increase the friction in the thermostatically controlled clutch or otherwise insure some degree of entrainment of the fan blade in the "open' condition of the clutch as determined by the thermostat. However, even this mode of operation has not proved to be effective because the increased friction continues even in the operating range of the clutch and may result in undue heating of the device.

It was, therefore, the principal object of the invention described and claimed in application Ser. No. 705,743 to provide an improved fan or blower system for the cooling of an internal-combustion engine wherein the aforementioned difficulties can be avoided and a rotation imparted to the fan blade without influencing or affecting the operation of the thermostatically controlled clutch.

This object was attained by providing, in parallel with the thermostatically controlled clutch for coupling the fan blade to a driven member when the air traversing the radiator of the engine-cooling system attains a predetermined minimum temperature, a speed-responsive auxiliary clutch operative during idling of the vehicle and of compact, built-in configuration.

The auxiliary idling clutch has a normally closed condition connecting the fan blade to the driving member in the rest condition of the clutch member, but opens at an adjustable angular velocity or rotary speed of this driving member to disengage itself from the fan blade. The auxiliary clutch which automatically disengages upon the attainment of a predetermined fan speed, enables the choice of the cutout speed to be made without consideration of the various operating conditions of the engine. Thus it is immaterial whether the driving member is rotated at idling speed at standstill of the vehicle or at idling speed during vehicle travel (e.g. during downhill) since in the latter case the thermostatic element receives an air current traversing the radiator of the vehicle.

In selecting the cutout point of the auxiliary clutch, numerous considerations are involved. The automobile engine has a relatively low idling speed, in term of revolutions per minute, with which it normally operates loaded at standstill of the vehicle. However, this idling speed is often raised by auxiliary devices supplied for cold-weather starting, choking or otherwise increasing the richness of the fuel/air mixture and the like, the higher speed being a "free-wheeling" idling speed. Thus one should set the cutout point of the auxiliary clutch at a rotary speed above not only the normal idling speed but also the augmented idling speed provided by such devices. There is, moreover, a spread, in terms of revolutions per minute, between the augmented idling speed and the lower load speed of the engine when the latter is coupled with the driving train of several hundreds of revolutions per minute. This speed differential is passed rapidly during acceleration so that the auxiliary clutch can conveniently be set in the range of the speed differential. This setting is particularly convenient and requires only a simple clutch structure.

The auxiliary clutch preferably was a detent or pawl clutch in which the latch of the detent assembly is centrifugally displaceable outwardly upon the driving member of the system while a toothed portion engageable with the detent is formed within the detent ring and is engageable by the latch. To facilitate the operation of the latch system, the latter may be mounted upon a support which frictionally engages the blower or fan flange.

The system of the principal application thus provides a fan arrangement for an internal-combustion engine, especially for automotive vehicles, which has its thermostatically controlled clutch operating in parallel with a so-called "idling clutch" responsive to the angular velocity and of the locking-engagement (e.g. tooth or pawl) type. Such systems have been found to be highly effective in practice although it is frequently desirable to, on the one hand, provide free-wheeling clutching without shock or impulsive actuation and, on the other hand, to increase the effectiveness of such clutches and the compactness of the clutch arrangement as a whole.

It is, therefore, another object of the present invention to provide a fan arrangement for internal-combustion engines and other shaft and rotor structures which carries forth the principles of my last-mentioned application and Ser. No. 705,743 to provide an improved "idler clutch" arrangement for the purposes previously described.

The improvement in accordance with the present invention resides in a speed-responsive clutch for, for example, coupling the fan blade of the internal-combustion engine to a driven shaft which clutch is operative during idling of the vehicle and has a normally closed condition connecting the fan blade to the driving member in the rest condition of the system and at low speeds, but which opens at a predetermined but adjustable angular velocity of the driving member to disengage the latter from the fan blade; the improvement resides in providing the speed-responsive clutch means, including the clutch member or members and its rotatable clutching face and, in general, both co-operating members of the clutch, radially outwardly of the bearing by which the driven member (e.g. the fan blade) is journaled on or with respect to the driving member (e.g. a shaft of the engine). This construction is advantageous in that it allows the speed-responsive clutch and especially the centrifugally effective mass thereof to be located at a greater distance from the axis of rotation, thereby increasing the centrifugal force tending to displace the mass and permitting a heavier centrifugal mass to be employed. In addition, the location of the speed-responsive clutch radially outwardly of the bearing allows the entire assembly to be made axially more compact. Also a region of generally unused space can be exploited for the convenient positioning of the centrifugally displaceable mass.

According to a more specific feature of the present invention, the fan-blade shaft is provided with a sleeve that extends rearwardly about the bearing such that it encloses the latter and projects beyond this bearing in the axial sense to form the friction surface for the speed-responsive clutch. In this embodiment, the centrifugally displaceable masses include weighted arms swingably mounted in the space surrounding this sleeve and frequently engageable with the outer periphery of the latter in the closed condition of the clutch and under the effect of a spring similarly located in the space around the sleeve. The arms are swingably mounted on the base of the clutch housing and, in the rest position of the system, bear frictionally against the surface of the sleeve. The provision of the sleeve does not represent any significant axial enlargement of the fan-blade arrangement since it extends rearwardly over the bearing in which the shaft is seated. When the speed-responsive or idler clutch is to be lubricated, the present invention provides that the speed-responsive clutch be separated from the thermostatically controlled clutch by a disk fixed to the clutch housing and to an axially extending cylindrical boss defining a chamber for the centrifugally displaceable bodies. The fan shaft is provided with a flange whose cylindrical outer surface forms a friction face for the centrifugally displaceable mass.

According to another advantageous construction of the system of the present invention, the centrifugally displaceable masses are arranged at the ends on axially extending arms which are formed as friction bodies and, upon the attainment of an angular velocity exceeding the predetermined level, are lifted axially from the friction ring whose carrier is fixed to the fan-blade shaft. The centrifugally displaceable arms can be connected with the clutch housing via an elastic or control spring which creates a quick-opening clutch structure limiting drag and slip.

I have also found that fluid clutching may be used in accordance with the principles of the present invention. Under these concepts, the clutch housing may include an inwardly biased membrane structure containing a centrifugally displaceable body of fluid and torque-converter, hydrodynamic brake or other vane structures designed to entrain the driven member with the driving member when the hydraulic fluid contacts them both. When, however, the speed of the driving member increases, the liquid is centrifugally displaced outwardly and removed from contact with the vanes etc. of the driven clutch member and the fluid connection between driving and driven members is decoupled.

The above and other objects, features and advantages of the present invention will become more readily apparent from the following description, reference being made to the accompanying drawing in which:

FIGURE 1 is an axial cross-sectional view through a fan-blade assembly for an automotive vehicle;

FIGURE 2 is a cross-sectional view along the line II - II of FIGURE 1;

FIGURE 3 is a section corresponding generally to FIGURE 2 but illustrating another embodiment;

FIGURE 4 is a partial axial cross-sectional view through a fan assembly according to the principles of the present invention;

FIGURE 5 is a cross-sectional view along the line V - V of FIGURE 4;

FIGURE 6 is an axial cross-sectional view through a portion of a fan-blade assembly according to another embodiment of the invention;

Figure 7:
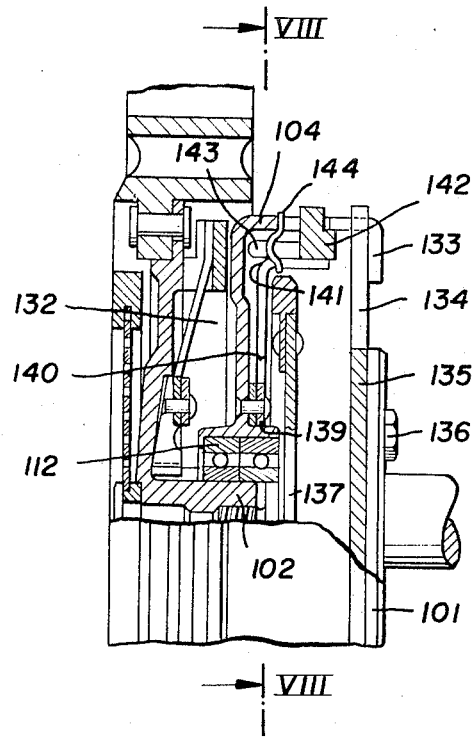
FIGURE 7 is a view similar to FIGURE 3 of still another arrangement for quick opening of the speed-responsive clutch.

In FIGURE 1, I show a V-belt pulley 1 which is mounted upon a flange 2 of an internal combustion engine not further illustrated by axially extending bolts whose heads are to be seen on the right-hand side of the pulley 1. Pulley 1 is driven by the fan belt from the crankshaft of the automotive-vehicle engine. The flange 2 carries a disk 3, constituting one of the clutch members of a thermostatically controlled main clutch, and is formed with a clutch lining 4 having a high coefficient of sliding friction and wear resistance. The clutch disk 3 has a central bore in which a pair of roller bearings 5 are mounted to rotatably support the shaft 6 of a fan blade 8. The fan-blade shaft 6 is provided at its free end with a transverse flange 7 to which the blade members are attached. A thermostatic-sensing element 10 (e.g. of the type described in the aforementioned U.S. Patents and constituted of a bimetallic dished disk), whose "decoupled" state is represented by an outward concavity and whose "coupled" state is represented by an outward convexity of this dished disk (dot-dash lines of FIGURE 1), is retained by a bolt 9 threaded into the fan-blade shaft 6. The bimetallic disk-type spring 10 has its outer periphery anchored in a ring 11' of a spider whose arms 11 extend axially inwardly through openings 7' between the hub flange 7 and the ring 7'' of the fan blade to terminate in a friction ring 12 which is juxtaposed with the friction lining 4.

The disk 3 is provided, upon its side opposite the pulley 1, with a cylindrical boss 13 surrounding the bearings 5 and defining around the shaft 6 an annular compartment in which an auxiliary clutch is disposed. The auxiliary, normally engaged clutch comprises a ring 14 which is rigidly connected with the cylindrical boss 3, i.e., by being constituted as a split ring which spreads outwardly thereagainst or by being press-fitted into this boss. Along the inner periphery of the ring 14, A weighted pawl 15 of segmental configuration is provided at one of its ends 22 so as to be centrifugally displaceable outwardly at a predetermined rotary speed of the fan blade. The pawl 15 is formed with a detent tooth 16 engageable in the absence of sufficient centrifugal force to draw the pawl outwardly with the single tooth 17 of shaft 6. The free end of the centrifugally displaceable pawl 15 is drawn inwardly against the shaft 6 by a tension spring 18 anchored to the opposite sides of the ring 15. In the rest position of the auxiliary clutch, the spring 18 draws the pawl 15 against the shaft 5 so that the detent notch 16 receives the tooth 17 (dot-dash position in FIGURE 2) and the disk 3 rotatably entrains the shaft 6 of the fan blade 8 in the direction of arrow 21. In the rest position of the auxiliary clutch, a form-fitting engagement is provided between the shaft 5 and the boss 13. Only when a predetermined elevated speed of the system is attained, does the centrifugal force developed by the fitted pawl 15 overcome the force of spring 18 and disengage the detent notch 15 from the tooth 17, thereby freeing the fan blade from the driven member 1 through 3. Adjustment is easily effected by changing the tension of the spring or the weight of the pawl.

While the auxiliary clutch is disengaged, any further drive of the fan blade is accomplished via the thermostatically controlled clutch which thus is independent of the auxiliary clutch. The fan blade lies inwardly of the usual vehicle radiator 19 connected in the engine-cooling system and traversable by a current 20 of cooling air which, as the vehicle travels forwardly, passes over the thermostatic device 10. After the engine has heated sufficiently, as indicated by the increased temperature of the air reaching the thermostatic element 10, the friction ring 12 is driven to the right and element 10 switches into its other stable condition (dot-dash lines in FIGURE 1) thereby frictionally connecting the fan arrangement 6 - 12 with the driving disk 3. Prior to the attainment of this temperature, however, the primary clutch remains in the position illustrated in FIGURE 1 in which the fan blade is decoupled from the driving member 1 through 3. This latter condition is reestablished when the thermostatic element is cooled sufficiently by the air-stream 20 passing thereover which renders the fan inoperative. To increase the effectiveness of the primary clutch, the self-tightening means of my prior patents, i.e. a screw and nut arrangement of steep-pitch threads, can be employed between the control element 10 and the friction ring 12.

To avoid a hard impact between the detent 15 and the tooth 17, the ring 14 is split at 14' (FIGURE 2) and frictionally engages the inner wall of the boss 13 so that a slight but resisted slip can occur between the ring 14 and this boss. In addition, resilience can be imparted to the ring by providing, in accordance with another feature of this invention, the end of the split ring remote from the hinge 22 of a reduced radial thickness as illustrated in FIGURE 2.

In the embodiment illustrated in FIGURE 3, the detent carrier is a spiral spring 25 which frictionally engages the inner wall 24 of the boss 13 and has, along its inner end, a centrifugally displaceable weight 26; the latter thus is spring loaded against the shaft 6 and has a notch 26' adapted to receive the tooth 17. Diametrically opposite the weight 26, I provide a counter weight 27 at the other end of the spiral spring which increases the force with which the spring 25 frictionally engages the inner wall 24 of the boss. With increasing angular velocity, the disk 3 and its boss 13 swing the weight 26 outwardly to release the tooth 17 and disengage the fan assembly 6, etc. from the driving member 1 through 3, thereby permitting the thermostatic device to control the fan.

The system of FIGURES 4 and 5, according to the present invention, comprises an annular flange 101 driven directly or indirectly by the internal-combustion engine via, for example, a shaft 101a and a fan blade whose shaft 102 is coaxial with the flange 101 and defines with the latter behind the fan and the radiator with which the fan is juxtaposed, a compartment for receiving the speed-responsive clutch.

In the embodiments of FIGURES 4 and 5, the speed-responsive clutch is shown to have a pair of centrifugally outwardly displaceable weights or masses 103, 103', the centers of gravity of which are represented at S in FIGURE 5.

These weights are constituted as generally sectoral arms which are swingably mounted at their pivots 125 and 125' upon the flange 101a and are adapted to frictionally engage a sleeve 105 which is affixed to the fan-blade shaft 102 but extends rearwardly to surround (in the radial sense) the roller bearing 112 which rotatably supports the shaft 102 relatively to the flange 101a and the shaft 101.

As can be seen in FIGURE 4, the sleeve 105 extends axially beyond the bearing 112. The clutch housing 104 is mounted by its springs 106 in a force-transmitting relationship with the flange 101, the springs 106 constituting clips which are received in the cutouts 107 of the annular flange 101a. The spring clips 106 also have resilient arms 108 which grip around projections 109 of the clutch housing 105. The resilient arm 108 of each of these springs 106 has protuberances 110 and 111 which seat on opposite radial sides of the projections 109 and prevent loosening of the attachment of the clutch housing 104 with the flange 101a.

The fan shaft 102 is provided with a flange 113 upon which the blades 115 are mounted at 114. As has been described in connection with the previous application, the thermostatic clutch means may be of the motion-amplifying type such that the fan shaft 102 is provided with a steep thread 115, upon which a nut 117 is adapted to screw, the nut 117 being tied by an elastic member 118 to the friction body 119. For the thermostatic actuation of the device, a control member 120 is constituted as a bimetallic body within a housing 121 connected by bars 122 with the friction body 119. The bars or webs 122 pass through cutouts 123 in the flange 113 of the blade.

The centrifugally displaceable blades 103 and 103' are tied together by spring 126, 126' affixed at the free end of the weighted arms 103 and 103' as represented at 161 and 163, and at a smaller lever distance to the pivotal end of the arms as represented at 162 and 164, respectively. The springs thus draw the free arms 103, 103' together against this outer surface of the sleeve 105 in the rest position of the device.

When the coupling housing 104 attains a predetermined angular velocity (threefold speed), the centrifugal force generated by the weighted arms 103, 103' overcomes the force of spring 126, 126', thereby lifting the weights from the outer periphery of the sleeve 105. The weights are brought to bear against the inner periphery 104a of the clutch housing 104. The speed-responsive clutch is thus opened without a thermostatic actuation of the temperature-controlled clutch arrangement for the fan and without influencing the latter in any way. The primary or temperature-responsive clutch is controlled by the bimetallic element 120 in the manner described in the primary application, thereby effecting cooperation between the friction body 119 and the friction 124.

In order to ensure a uniform and wear-free frictional engagement of the arms of the speed-responsive clutch during clutch operation, there is provided a lubricating device 127 (FIGURE 5), which may include a lubricant-saturated wick or pad held by the spring 129 against the countersurface 105a of the sleeve 105. The spring 129 is anchored at 128 to the clutch housing 104 (see FIGURE 5). The pad is preferably composed of felt and is held lightly against the sleeve 105 which is rotatably entrained with the shaft 102. Similar pads may also be provided in the centrifugally displaceable weights 103, 103' so that they become effective only in the closed condition of the free-wheeling or idler clutch. As noted earlier, the locations 162 and 164 at which the springs 126 and 126' are anchored to the pivoted end of the arms 103, 103', lie radially outwardly of the pivots 125 and 125' so that, once the arms 103, 103' are lifted slightly from the surface of the sleeve 105, the lever distance of the spring tending to swing these arms away from the sleeve increases whereas the distance of the masses tending to swing the arms toward the sleeves decreases; consequently, the springs 125 and 126' act in conjunction with the centrifugal force to open the clutch once a predetermined movement of the arms 103, 103' away from the sleeve has commenced.

In the embodiment of FIGURE 6, the thermostatically controlled clutch has not been illustrated and only the speed-responsive clutch is shown. Between the two clutches, however, there is provided a disk 104'' which separates the temperature-responsive clutch compartment from the speed-responsive clutch compartment. The partition 104' is journaled on the shaft 102 via the bearing 112 while the fan shaft 102 is formed with a flange 130 whose outer periphery constitutes the friction surface 131 which is engaged by the arms 103, 103' previously described. The housing 104' of the speed-responsive clutch has an inwardly extending flange 101' which is affixed to the flange 101 by bolts. The friction surface 124 for the temperature-responsive clutch is also shown to be formed on the clutch housing 104 whose cylindrical wall is represented at 104'. The weighted arms 103 and 103' are provided in the annular space surrounding surface 131 and the bearing 112 as shown in FIGURES 4 and 5.

Figure 8:
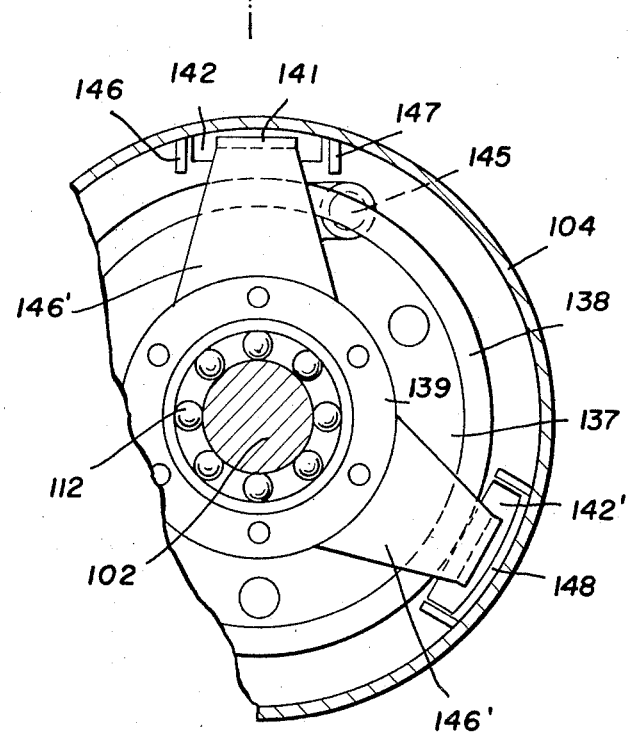
FIGURE 8 is a cross-sectional view taken along the line VIII-VIII of FIGURE 7.

In FIGURES 7 and 8, there is illustrated a speed-responsive clutch in accordance with the present invention in which the thermostatically controlled clutch (e.g. corresponding to that of FIGURE 1) is shown generally at 132. The clutch housing 104 is here shown to be formed with arms 133 whose ends grip about the resilient portion 134 of a flange 135 so that a form- and force-fitting connection between the fan clutch and flange 135 is created. Protuberances on both sides of the arms 133, not shown in the drawing, prevent undesired loosening of this connection as has already been described in connection with the protuberances 110 and 111 of FIGURE 4. The flange 35 is affixed by bolts 136 to the driving flange 101.

The fan-blade shaft 102 has a disk-like flange 137 which forms a mounting plate for the driven bearing race of bearing 112, and which also carries the friction ring 138. On the clutch housing 104, there is provided a spring disk 139 with radial arms 140. The ends 141 of arms 140 are bent in the axial direction and carry centrifugally displaceable masses 142. In the illustrated working position of the device, corresponding to an angular velocity above the "clutch-opening" or threshold angular velocity of the speed-responsive clutch, the weights 142 of the arms 140 are brought to bear against the cylindrical portion of the clutch housing 4 in a radial sense while protuberances 143 from the planar portion of the clutch housing 104 engage the arms axially. A quick opening mechanism is formed by the spring 144 which controls the cut-out and cut-in of the speed-responsive clutch with any desired hysteresis characteristics.

In the rest position (at zero revolutions per minute) and at rotary speeds below the predetermined threshold of the speed-responsive clutch, the arms 140 of the spring disk 149 press axially against the friction ring 148, and the fan shaft 102 of the blade 115 is driven. The centrifugally displaceable masses 142 at the ends 141 of the arms 140 are withdrawn from contact of the surrounding interperiphery of the housing 104. As the rotary speed increases, the weights 142 are centrifugally flung outwardly, the centrifugal force bending the radial arms 140 away from friction ring 138 to open the speed-responsive clutch. Spring 144, of course, controls the switchover point.

To insure a uniform frictional effectiveness, there is provided a lubricating arrangement 145 (FIGURE 8) in the form of a felt pad or the like saturated with lubricant and carried by the arms 140 in contact with the friction ring 138. To guide the weights 142, the clutch housing 144 is provided with webs 146 and 147 extending radially inwardly and bent as flaps from the clutch housing to flank the weight 142. In this fashion, openings are provided in which a portion of the centrifugally displaceable weights 142 can project radially to insure proper positioning of the weights in the fully open condition of the clutch.

In the upper part of the device, as seen in FIGURE 8, the centrifugally displaceable mass 142 is shown in a position corresponding to that above the threshold speed and in which the weight rests against the housing and/or passes partly through the opening in the housing 104 at the lower right-hand part of FIGURE 5, the centrifugally displaceable mass 142 is shown in its position corresponding to the closed condition of the clutch so that a gap 148 is provided between the mass 142 and the inner peripheral wall of the housing 104.

Figure 9:
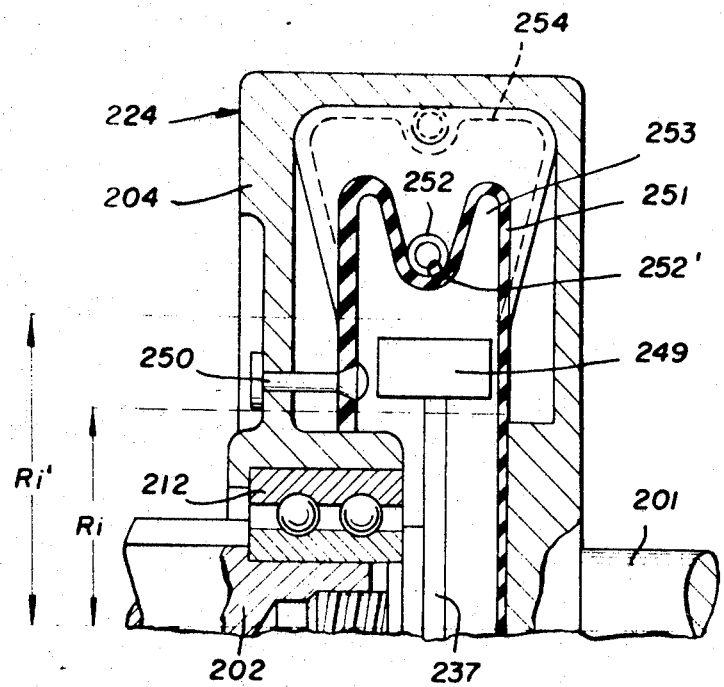
FIGURE 9 is another view similar to FIGURE 3 showing a fluid clutch operating on hydrodynamic principles.
Figure 10:
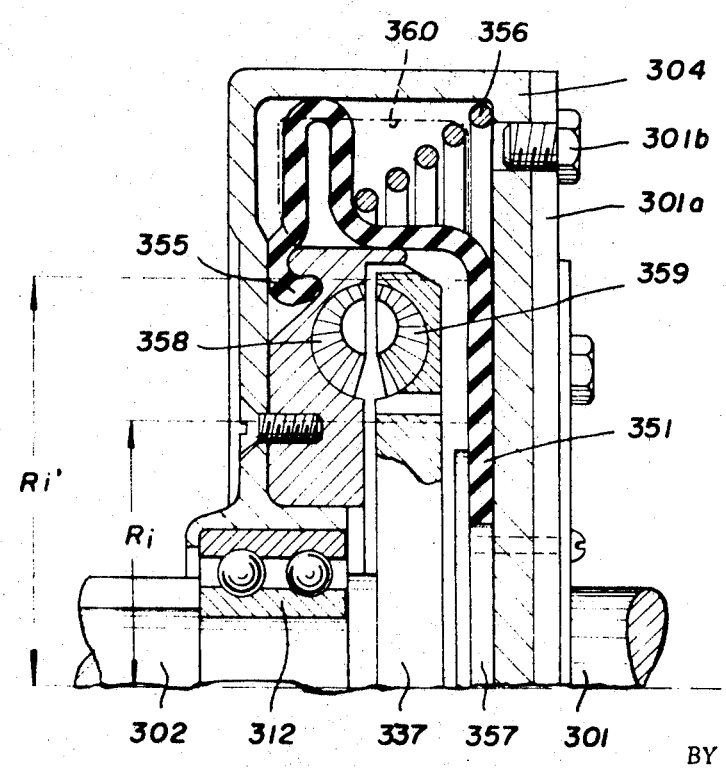
FIGURE 10 is an axial cross-sectional view through a portion of a hydrodynamic speed-responsive clutch drawn to a somewhat enlarged scale.

In FIGURES 9 and 10 there are shown hydraulic clutch arrangements embodying the present invention and in both cases, the thermostatically controlled clutch has been removed for clarity in illustrating the speed-responsive clutch. The speed-responsive clutch of FIGURE 9 makes use of a liquid as the centrifugally displaceable mass and comprises a clutch housing 204 provided with a friction surface 224 (analogous to the surface 124) with which the thermostatic clutch co-operates. The fan-blade shaft 202 is formed with a flange 237 which has flat or curved surfaces 249 constituting vanes and creating one of the two hydraulically coupled clutch members, the other being formed by the housing 204. On the clutch housing 204, a flexible bellows-type membrane 251 is mounted via rivets 250, the bellows having the position illustrated in solid lines when the device is in its rest position. A spiral spring 252 bears inwardly at the trough 252' of the bellows when the system is in its rest position. The chamber surrounding the bellows is vented to the atmosphere while the chamber 253 therewithin contains the liquid at a volume such that the vanes 249 are immersed in the belt of fluid centrifugally surrounding the bearing 212 when the speed rotates at less than the threshold speed. The belt of fluid has its inner periphery at a radial distance $R_i$ from the axis of the device, housing shaft 201 is affixed to the clutch housing 204.

With increased speed, centrifugal force spreads the bellows 251 outwardly (into the position shown at 254) whereupon the liquid band is a toroid with inner radius $R_i'$ greater than the radius of the vanes 249. The vanes 249 are no longer immersed in the liquid and a liquid entrainment no longer is sustained. The clutch is then opened. When the speed reduces, an inward movement of the liquid again couples the housing 204 rotatably with the vanes 249. The clutch of FIG. 9, as previously described, operates independently of the thermostatic clutch.

FIG. 10 shows a speed-responsive clutch in which liquid acts as the clutching medium and the operation is based upon hydrodynamic torque-transfer principles. The housing 304 is formed with one half 358 of the generally toroidal torque-converter structure 358, 359 coupled together by the liquid. Upon a flange 337 of the fan-blade shaft 302, the second semi-toroidal turbine portion 359 is provided. As long as the rotary speed of housing 304 is relatively low, the pumping and turbine portions 358 and 359 of the hydrodynamic clutch both contact the liquid which lies in a ring with an inner radius $R_i$. With an increase in the rotary speed, the bellows-shaped membrane 351 is urged outwardly into its broken line position 360 against a spiral spring 356 so that the liquid torus eventually has an inner periphery with a radius $R_i'$ outwardly beyond the pumping and driven portions 358, 359 of the hydrodynamic clutch. The membrane 351 is affixed at 355 to the left-hand wall of the clutch housing 304 and at 357 to the right-hand wall of this clutch housing. It has been found that a torque-converter type structure using a liquid clutch as illustrated in FIG. 10, is capable of transmitting greater loads than the friction- and pawl-type clutches previously described. The bearings 312 supports the fan-blade shaft 302 while the clutch housing 304 is mounted upon the flange 301a of shaft 301 via bolts 301b.

While the foregoing description has been based primarily on the use of the clutch of the present invention in the cooling-system fan of an internal combustion engine, it will be understood that the speed-responsive clutches may be used independently of thermostatic clutches for any multispeed drive in which it is desired to connect a driven element with one or more driving elements or vice versa. Such drives have been found to be particularly advantageous for washing machines to switch between a low washing speed and a high extraction speed.

I claim:

1. An internal-combustion-engine cooling system having a fan blade in the path of a stream of cooling air traversing a radiator of said cooling system, a driven shaft operatively connected with said fan blade, a driving shaft coaxial with said driven shaft, a bearing coaxial with said shafts and rotatably supporting said driven shaft with respect to said driving shaft, thermostatically controlled primary clutch means between said driving shaft and said driven shaft and responsive to the temperature of the cooling air traversing said radiator for coupling said shafts together upon attainment of a predetermined minimum temperature; and rotary speed-responsive auxiliary annular clutch means, said annular clutch means including at least one member connected to each of said shafts for entrainment therewith located radially outwardly of said bearing and operatively connecting said fan blade with said driving shaft at rotary speeds of the driving shaft below a predetermined threshold but decoupling said fan blade from said driving shaft upon the attainment of said threshold speed, said threshold speed lying between the high idling speed and the loaded speed of said engine, said primary clutch means including a bimetallic spring disk, and a clutch body carried by said driven shaft and displaceable by the action of said bimetallic spring disk to connect said shafts for joint rotation.

2. The cooling system device in claim 1 wherein said auxiliary clutch means includes a movable clutch member and spring means for the snap-action displacement of said movable member.

3. An internal-combustion-engine cooling system having a fan blade in the path of a stream of cooling air traversing a radiator of said cooling system, a driven shaft operatively connected with said fan blade, a driving shaft co-axial with said shafts and rotatably supporting said driven shaft with respect to said driving shaft, thermostatically controlled primary clutch means between said driving shaft and said driven shaft and responsive to the temperature of the cooling air traversing said radiator for coupling said shafts together upon attainment of a predetermined minimum temperature; and rotary speed-responsive auxiliary annular clutch means, said annular clutch means including at least one member connected to each of said shafts for entrainment therewith located radially outwardly of said bearing and operatively connecting said fan blade with said driving shaft at rotary speeds of the driving shaft below a predetermined threshold but decoupling said fan blade from said driving shaft upon the attainment of said threshold speed, said threshold speed lying between the high idling speed and the loaded speed of said engine, said driven shaft being provided with a cylindrical sleeve surrounding said bearing and forming one of said members, the other of said members being constituted as a pair of weighted arms swingable centrifugally toward and away from said sleeve and frictionally engageable therewith at a rotary speed of said driving shaft below said threshold, each of said arms being pivoted at one end to said driving shaft.

4. The improvement defined in claim 3 wherein said auxiliary clutch means further includes a clutch housing rotatably entrained with said driving shaft and enclosing said weighted arms and said sleeve, said weighted arms being swingably mounted on said housing, and spring means interconnecting said weighted arms is urging same in the direction of said sleeve.

5. An internal-combustion-engine cooling system having a fan blade in the path of a stream of cooling air traversing a radiator of said cooling system, a driven shaft operatively connected with said fan blade, a driving shaft coaxial with said driven shaft, a bearing coaxial with said shafts and rotatably supporting said driven shaft with respect to said driving shaft, thermostatically controlled primary clutch means between said driving shaft and said driven shaft and responsive to the temperature of the cooling air traversing said radiator for coupling said shafts together upon attainment of a predetermined minimum temperature; and rotary speed-responsive auxiliary annular clutch means, said annular clutch means including at least one member connected to each of said shafts for entrainment therewith located radially outwardly of said bearing and operatively connecting said fan blade with said driving shaft at rotary speeds of the driving shaft below a predetermined threshold but decoupling said fan blade from said driving shaft upon the attainment of said threshold speed, said threshold speed lying between the high idling speed and the loaded speed of said engine, said auxiliary clutch means including a housing rotatably entrained with said driving shaft and formed with a partition separating said primary clutch means from said auxiliary clutch means.

6. An internal-combustion-engine cooling system having a fan blade in the path of a stream of cooling air traversing a radiator of said cooling system, a driven shaft operatively connected with said fan blade, a driving shaft co-axial with said driven shaft, a bearing coaxial with said shafts and rotatably supporting said driven shaft with respect to said driving shaft, thermostatically controlled primary clutch means between said driving shaft and said driven shaft and responsive to the temperature of the cooling air traversing said radiator for coupling said shafts together upon attainment of a predetermined minimum temperature; and rotary speed-responsive auxiliary annular clutch means, said annular clutch means including at least one member connected to each of said shafts for entrainment therewith located radially outwardly of said bearing and operatively connecting said fan blade with said driving shaft at rotary speeds of the driving shaft below a predetermined threshold but decoupling said fan blade from said driving shaft upon the attainment of said threshold speed, said threshold speed lying between the high idling speed and the loaded speed of said engine, said auxiliary clutch means including a housing rotatably entrained with said driving shaft and formed with a partition separating said primary clutch means from said auxiliary clutch means, the member connected with said driven shaft is an axially facing friction ring received in said housing and said member connected with said driving shaft is provided with a plurality of angularly spaced, axially extending but radially deflectable weighted arms normally engaging said ring but retractable from said ring upon centrifugally outward deflection of said arms.

7. The improvement defined in claim 6 wherein said housing is formed with openings at least partly receiving said arms in centrifugally outwardly deflected conditions thereof, said auxiliary clutch means further comprising spring means providing a quick opening and closing of said auxiliary clutch means.